US008660212B2

(12) United States Patent
Ponnuswamy

(10) Patent No.: US 8,660,212 B2
(45) Date of Patent: Feb. 25, 2014

(54) INTERFERENCE CLASSIFICATION WITH MINIMAL OR INCOMPLETE INFORMATION

(75) Inventor: Subburajan Ponnuswamy, Cupertino, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 471 days.

(21) Appl. No.: 13/016,458

(22) Filed: Jan. 28, 2011

(65) Prior Publication Data

US 2011/0188544 A1 Aug. 4, 2011

Related U.S. Application Data

(60) Provisional application No. 61/299,845, filed on Jan. 29, 2010.

(51) Int. Cl.
*H04L 27/00* (2006.01)
*H04B 3/46* (2006.01)
*H03D 1/04* (2006.01)
*H04L 23/00* (2006.01)

(52) U.S. Cl.
USPC ............ 375/316; 375/224; 375/346; 375/377

(58) Field of Classification Search
USPC ......... 375/224, 227, 228, 259, 260, 267, 316, 375/346, 377
See application file for complete search history.

(56) References Cited

U.S. PATENT DOCUMENTS

| | | | | |
|---|---|---|---|---|
| 7,254,191 B2* | 8/2007 | Sugar et al. | | 375/340 |
| 8,340,578 B2* | 12/2012 | Tolentino et al. | | 455/41.2 |
| 2002/0181417 A1* | 12/2002 | Malhotra et al. | | 370/329 |
| 2004/0028123 A1* | 2/2004 | Sugar et al. | | 375/224 |
| 2004/0156440 A1* | 8/2004 | Sugar et al. | | 375/259 |
| 2005/0003828 A1* | 1/2005 | Sugar et al. | | 455/456.1 |
| 2005/0245269 A1* | 11/2005 | Demirhan et al. | | 455/452.1 |
| 2008/0200195 A1* | 8/2008 | Abe et al. | | 455/501 |
| 2009/0124205 A1* | 5/2009 | Aboba et al. | | 455/63.1 |
| 2009/0149135 A1* | 6/2009 | Mangold et al. | | 455/77 |
| 2010/0303183 A1* | 12/2010 | Desai | | 375/350 |

* cited by examiner

*Primary Examiner* — Tesfaldet Bocure
(74) *Attorney, Agent, or Firm* — Varun A. Shah

(57) ABSTRACT

Interference classification with minimal or incomplete information. Receivers in access points and in other network devices on a wireless digital network may be switched to a spectrum monitor mode in which they provide amplitude-versus-frequency information for a chosen part of the spectrum. This may be performed by performing a FFT or similar transform on the signals from the receiver. Receivers are calibrated with known interference sources in controlled environments to determine peaks, pulse frequency, bandwidth, and other identifying parameters of the interference source in best and worst case conditions. These calibrated values are used for matching interference signatures. Calibration is also performed using partial signatures collected over a short period in the order of microseconds. These partial signals may be used to detect interferers while scanning. Another aspect of the invention is to record the variation of noise floor in the presence of interference sources. Multiple interference sources may be detected. While data collection is performed in one or more APs, classification may be performed in the AP or on other systems associated with the network collecting and processing spectrum information from one or more APs.

31 Claims, 2 Drawing Sheets

INTERFERENCE CLASSIFICATION WITH MINIMAL OR INCOMPLETE INFORMATION

CROSS-REFERENCES TO RELATED APPLICATIONS

This application claims the benefit of priority on U.S. Provisional Patent Application No. 61/299,845 filed Jan. 29, 2010 and entitled "Interference Classification with Minimal or Incomplete Information".

BACKGROUND OF THE INVENTION

The present invention relates to wireless networks, and in particular, to the problem of classifying interference sources using incomplete or minimal information.

Wireless digital networks are becoming ubiquitous in enterprises, providing secure and cost-effective access to resources. In operation, a plurality of access points (APs) advertise and provide wireless services to wireless clients. Client devices may range from the traditional such as laptop and other portable computers, to dual-mode phones, wireless data entry devices and scanners, wireless data acquisition systems, and more.

These wireless networks operate using frequencies and power levels assigned by regulatory agencies; the set of frequencies and power levels varies from regulatory domain to regulatory domain. The most common bands for wireless networks include frequency ranges around 2.4 GHz and 5 GHz.

In most regulatory domains, wireless networking systems are not the sole, or even primary users of a frequency band such as the 2.4 GHz band. As an example, in the United States, wireless networking devices operating to IEEE 802.11 standards are secondary users of the 2.4 GHz ISM band, operating under Part 15 of the FCC rules. As Part 15 devices, they must tolerate any interference from other authorized devices on the band. Those other devices on the band include microwave ovens, Bluetooth devices, a myriad of cordless phones, video and audio devices, and more. Additionally, Amateur Radio operators are authorized to use a portion of the 2.4 GHz band, covering channels 1 through 6, at power levels up to a kilowatt.

Wireless networks must live with, and adapt to such conditions. Detecting and dealing with interference from another wireless network is a fairly simple process; scan the available channels listening for other networks, and pick the channel which offers the best performance given the other users of the band.

For interference sources which are not other network devices, however, the process is not as simple. The first step is to classify non-network interference sources. Is the source intermittent or continuous? What frequency or frequencies does it cover? At what power levels? Are the effects localized to one or a small number of access points?

An additional challenge is to make these determinations using the wireless receivers present in devices such as network access points, laptops and other computing devices.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of classifying interference to a digital network. While the invention is described herein in terms of IEEE 802.11 wireless networks, the techniques are equally applicable to other digital systems and networks including but not limited to WiMAX, Bluetooth, and 3G/4G.

According to the invention, wireless receivers such as access points and clients on a wireless digital network may be switched to a spectrum monitor mode in which they provide amplitude-versus-frequency information for a chosen part of the spectrum. This may be performed by performing a FFT or similar transform on the received signals. Wireless receivers are calibrated with known interference sources in controlled environments. The calibration process captures the interference signatures as seen by a particular type of receiver and the signatures may include relative peak amplitudes, peak to average ratio, center frequency, pulse repetition frequency, hopping pattern, bandwidth, and other identifying parameters of the interference source in best and worst case conditions. These calibrated values are used for matching interference signatures captured during the operation of the spectrum monitor. Calibration is also performed using partial signatures collected over a short period in the order of microseconds. These partial signals may be used to detect interferers while scanning multiple channels. Another aspect of the invention is to record the variation of noise floor in the presence of interference sources on the operating channel as well as adjacent channels.

Figure 1:
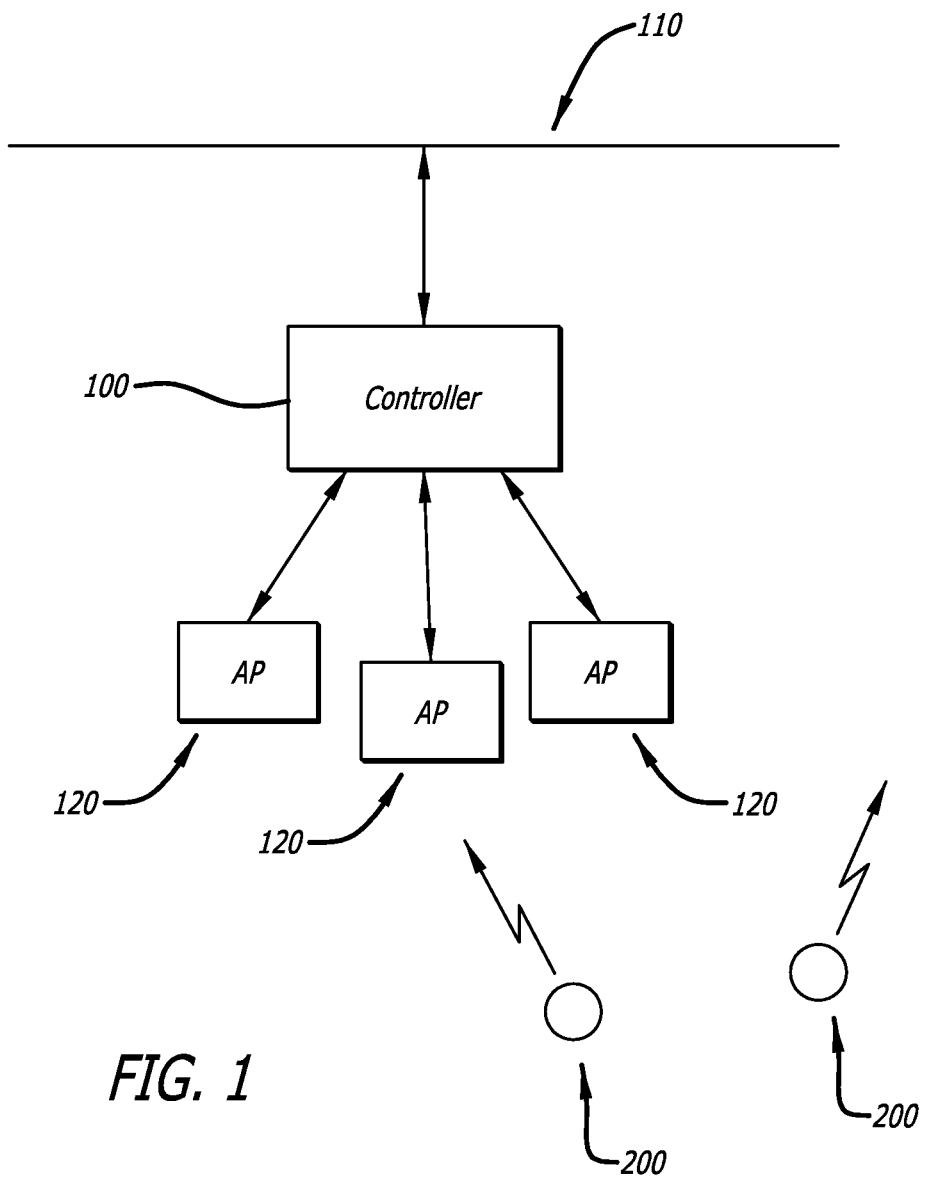
FIG. 1 shows a wireless network.

FIG. 1 shows a network in which controller 100 connects to wired network 110. In one embodiment of the invention, controller 100 supports multiple access points (AP) 120. Also present are interference sources 200.

As is known to the art, controller 100 and access points 120 are purpose-built digital devices, each containing a processor, memory hierarchy, and input/output interfaces. Processors used generally include MIPS class processors, as well as processors from companies such as Cavium, Intel, AMD, and Acorn. The memory hierarchy typically includes fast read-write memory such as DRAM for device operation, and non-volatile memory such as Flash for file storage and device startup. Controller 100 and access points 120 typically operate under the control of an operating system such as Linux or other real-time capable system.

Controller 100 typically has a plurality of wired interfaces, such as IEEE 802.3 Ethernet interfaces. Access points 120 typically have at least one wired interface, such as an IEEE 802.3 wired Ethernet interface, and contain receivers for receiving signals, such as IEEE 802.11 wireless signals. Multiple receivers may be present, for the same band, or for multiple bands. As an example, receivers may be provided for both 2.4 GHz and 5 GHz bands. These may be provided in the form of radio modules containing receivers, transmitters, and modulation/demodulation subsystems.

According to the invention, receivers in Access Points (APs) 120 and in other network devices may be operated in a first, normal mode, and a second, spectrum monitor mode. These modes may be combined to provide a hybrid device that can support both Access Point and Spectrum Monitor functions. In this second, spectrum monitor mode, in addition to receiving and decoding signals on a selected channel and bandwidth, the receiver also collects amplitude-versus-frequency information for the selected channel. This may be done, for example, by performing a fast Fourier transform (FFT) or other suitable transform on the receiver signal. The output of this spectrum monitor mode is a set of amplitude measurements for different frequency bins comprising the channel.

According to the invention, a receiver is calibrated with known interfering sources such as a video bridge, Bluetooth, microwave ovens and cordless phones on all channel widths (e.g., 20 MHz and 40 MHz). This is necessary because the exact waveform (peak amplitude, bandwidth, center frequency, etc) that will be seen by an wireless radio such as those based on IEEE 802.11 for the same interference source is often different from that of a traditional spectrum analyzer. Since the receive filters in IEEE 802.11 radios are not quite as sophisticated as those present in a spectrum analyzer, the structure of the waveforms seen by the IEEE 802.11 radio in an AP can be quite different. In addition, the receive channel size (20 MHz or 40 MHz or 80 MHz) also affects the shape of the waveforms. Therefore, the calibrated reference waveform will be used as a basis to match the interference signatures. The calibrated waveforms are further refined by initial calibration of the radio using a known uniform waveform or signal generator. Signal generator calibration provides the expected difference between the known source and the waveform seen by the IEEE 802.11 radio's FFT engine. This calibration is also performed on the entire receive chain, from the antenna through the receiver. The expected difference between the source waveform and detected waveform is used to create the offsets (frequency, bandwidth, and amplitude) used to match the signatures of other known interferers.

This calibration process may be repeated for each different type of receiver to be used as a spectrum monitor, and may be repeated for different antenna types as well.

Another aspect of calibration is to determine the partial signatures of interferers on a single IEEE 802.11 channel of specific width that can be detected within a small time interval, which is usually in microseconds or milliseconds. If the receiver were to stay on the channel for a longer period of time it should be able to capture the entire signature patterns of the interferers and match it against the stored pattern. In an AP-based 802.11 spectrum analyzer, the receiver cannot stay on the channel for long since it has to scan the entire Wi-Fi spectrum. The calibrated partial signature information is used to detect interferers while scanning. In order to accomplish this, the 802.11 receiver calibrates with each known interferer, while constantly scanning (i.e., moving across channels) and stores incomplete spectral signatures for each type of interferer. During normal operation the incomplete signatures are used to match the interferers.

Another aspect of calibration according to the invention is to record the variation of noise floor in the presence of interferers. The 802.11 receiver is designed to calibrate its noise floor value when there is no activity on the channel (quiet time). Finding a quiet time may not always be possible when there are interferes that remains ON for a longer duration than the noise floor process's timeout, including constant interference sources such as audio or video bridges that will be transmitting almost 100% of the time (i.e., with higher duty cycle). The calibrated noise floor information is used to calculate the actual signal strength of each FFT bin since the FFT samples only provide the Signal to Noise Ratio for each bin. This process allows the classifier to accurately determine the characteristics of the interferer, including the signal strength, bandwidth and duty cycle. Another important use of this noise floor is to detect and prevent spurious false detections. In some noisy or dense environments the actual noise floor may be higher than the nominal noise floor. In these environments, the classification algorithm may incorrectly identify devices due to the increase in noise floor in the frequency bins of interest. This is typically one of the reasons for false detections for interferers such as microwave ovens. Since the noise floor variations for each type of interferer from the calibrated information are known, the classification algorithm according to the invention will correctly identify this as a false detection since the increase in noise floor is due to actual noise on the channel and not due to the presence of this particular type of interferer.

Yet another aspect of calibration according to the invention is to record the signatures of multiple interferers that are active simultaneously. The signatures need to be carefully calibrated to properly detect the presence of multiple interferers. Without such calibration, some interferers could not be detected reliably when another interferer is preset or could lead to false detections.

Since only a limited set of options for scanning available channels is available (e.g., 20 MHz and 40 MHz), scanning has to take into account multiple competing goals. In order to get complete classification data, it is preferable for the radio to stay on a specific channel as long as possible. The same is true for estimation of the actual duty cycle on a channel. However, the spectrum analysis features require full-spectrum visibility, which may include both 2.4 GHz (about 100 MHz of spectrum) and 5 GHz (about 500 MHz), including the ability to classify interferers on any part of the spectrum. Therefore, the entire spectrum needs to be scanned at least once during a specific interval of interest. The interval of interest could be a few 10 s of milliseconds to a few seconds.

In addition to interferer classification, the 802.11 based spectrum analyzer is also required to support detection and classification of all 802.11 devices (such as rogues, authorized/unauthorized APs/clients). Therefore, the underlying scanning method needs to support classification of interferers and 802.11 devices.

In order to detect all possible 802.11 devices scanning of all possible channel widths is required. For example, scanning only 40 MHz or 80 MHz channels may not be able to detect all 802.11 devices operating in 20 MHz channels. In addition, some rogue, unauthorized or misconfigured 802.11 devices may operate on a "non-standard" channel. In order to scan the entire spectrum (e.g., 500 MHz or more) within a specific time interval (e.g., 500 ms or one second), scanning all 20 MHz channels is not practical since classification requires that the radio spend a reasonable amount of time on each channel. Scanning according to the invention uses known as well as dynamically obtained information to intelligently decide the number and type (e.g., channel width) of channels to scan and the amount of time to stay on a channel (i.e., sweep time).

The detection history of 802.11 devices is one of the factors in determining scanning frequency and sweep time. For example, although there are 14 possible 20 MHz channels in 2.4 GHz spectrum, these channels overlap. Some channels are preferred over others depending on detected activity, history and known deployment patterns. However, all channels are scanned at least once so as not to miss any potential interference sources or 802.11 devices on that channel. The detection of interferer on a specific channel will also determine how often to visit the affected channels, depending on the type of interferers.

Interferer characteristics and known channels of operation of the interferers are further used to optimize the scanning frequency and sweep time. For example, Microwave Ovens affect a specific set of channels in the 2.4 GHz band. Similarly, licensed cordless phones in the 5 GHz band typically operate in the upper 5 Ghz band. The channel scanning algorithm takes this information into account while determining the order of channel scanning, how often to visit a channel and how long to remain in a channel.

According to the invention, an estimation algorithm is used to reconstruct incomplete signals and classify the interferer when the interference signature is interleaved with another stronger interferer or 802.11 signals. Since the wireless receiver may be configured to receive the strongest signals and/or to give preference to 802.11 signals, a relatively weaker interference signature may only be partially received while the stronger or preferred (e.g., 802.11) signal overlaps the interferer in time. In this case, the wireless receiver may start to receive the interference signature and then switch to receiving the stronger or preferred signal. Depending on the duration of the initial interferer signal, the rest of this signal may be received after the completion of the stronger or preferred signal. Based on the incomplete matching of the interference signatures, timestamps associated with the initial signature and the stronger or preferred signal and the rest of the interference signature if any, the estimation algorithm reconstructs the entire interference signature duration to properly detect the interferer.

There are many challenges in detecting the presence of multiple interferers on the same channel. When there are more than one type of interferer and at least one of the interferers has relatively higher duty cycle, given the short sweep time requirements of the spectrum analysis function, it would be difficult to get distinct signatures of each interferer. Since we have calibrated information about such multiple interferers, the classification algorithm looks for such combinations in addition to individual signatures to determine if multiple interferers are present.

When there is more than one interferer of the same type, a simple classifier may not be able to distinguish the presence of multiple interferers. An example is the presence of multiple Bluetooth devices in the 2.4 GHz band. Classification uses interferer specific profiling information to determine such multiple interferers, in addition to the signal strength information. For example, Bluetooth devices or some cordless phones have specific frequency hopping patterns and hopping frequencies. When the detected signatures indicate a higher hopping frequency, the number of devices is estimated based on the number of hopping signals detected within the dwell time vs. expected hopping frequency for that specific device. The signal strength offers another data point for classification to distinguish the presence of multiple devices of the same type. When there are multiple signatures of the same type with significant difference in signal strength, it typically indicates the presence of multiple devices. Since some devices may be mobile (e.g., someone using Bluetooth may be walking away from the AP making measurements), classification takes this into account in determining the time window to be used for determining the presence of multiple devices.

Another challenge with non-802.11 device classification is duplicate detection and correlation of devices detected on multiple channels. Since the wireless receiver cannot decode any of the non-802.11 protocols, classification must rely on heuristics to detect the interferers. Many interfering devices such as Bluetooth, Cordless phones, audio/video bridges and Microwave Ovens can affect more then one channel. To make things difficult some devices such as Microwave Ovens may appear with different signal strengths on different channels.

Classification according to the invention uses multiple techniques to detect duplicates. For frequency hopping devices such as Bluetooth and Cordless, the hopping frequency is primarily used to determine duplicate devices since the signal strength of these devices will be approximately the same on all detected channels, with proper noise floor calibration. A device-specific threshold is used to account for any fading effects that may result in amplitude fluctuations. For other devices such as Microwave Ovens and fixed frequency devices, the known center frequency as well as the calibrated information is used to match partial signatures from different channels to construct the original signal and avoid duplicate detections. When a center frequency is used, an offset around the known center frequencies of discovered devices on different channels are used to correlate and identify duplicates.

For Microwave Ovens, the peak can be detected based on known and calibrated information within a few bins of frequency offset. Since the signal strength on the adjacent channel will be less than the peak, the signals on multiple channels are stitched together to reconstruct the original Microwave Oven signal and detect duplicates.

Once a device is detected by the classification process, the calculation of the bandwidth and duty-cycle of the interfering device are necessary for the purpose of notification to the user as well as for RF management purposes.

For known interference sources, the bandwidth and duty-cycle are determined based on the classification and sub-classification. For example, once Bluetooth is detected, the type of Bluetooth device or hopping pattern is determined (e.g., stereo headset vs. mouse, regular vs. adaptive hopping). Once the sub-type is determined, the estimated bandwidth and duty-cycle are calculated. This is accomplished by extrapolating the bandwidth and duty-cycle based on the dwell-time. Then the estimated values are compared with the known values for that specific device. When the difference between the estimated and known values is within a specific threshold, the known values are used; otherwise the estimated values are used. Similar techniques are used to estimate the bandwidth and duty-cycle of devices such as Microwave Ovens.

For unknown devices and other fixed frequency devices, extrapolation is used to detect the bandwidth and duty-cycle.

While the process of collecting spectrum samples must take place at the wireless receiver such as an AP, analysis can take place at the wireless receiver, at a controller hosting a plurality of wireless receivers such as APs, or by a process running on a dedicated host, or a process running on a client device connected to the network. As an example, in one embodiment of the invention, spectrum samples are collected from one or more APs in the network by a process running on a dedicated host. This process periodically scans for interference sources, or initiates a scan for interference sources when other monitored aspects of network operation, such as error rates, retries, noise floors, channel data rates, and the like change. The dedicated host need not be co-located with the network; it may be present at a remote location such as at a corporate monitoring site, as long as connectivity is provided.

In another embodiment of the invention, analysis can be performed by a process running on a client device such as a laptop computer associated with the network, collecting samples from one or more APs.

As is known to the art, the present invention may be realized in hardware, software, or a combination of hardware and software. The present invention may be realized in a centralized fashion in one computer system, or in a distributed fashion where different elements are spread across several interconnected computer systems associated with the network. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

Figure 2:
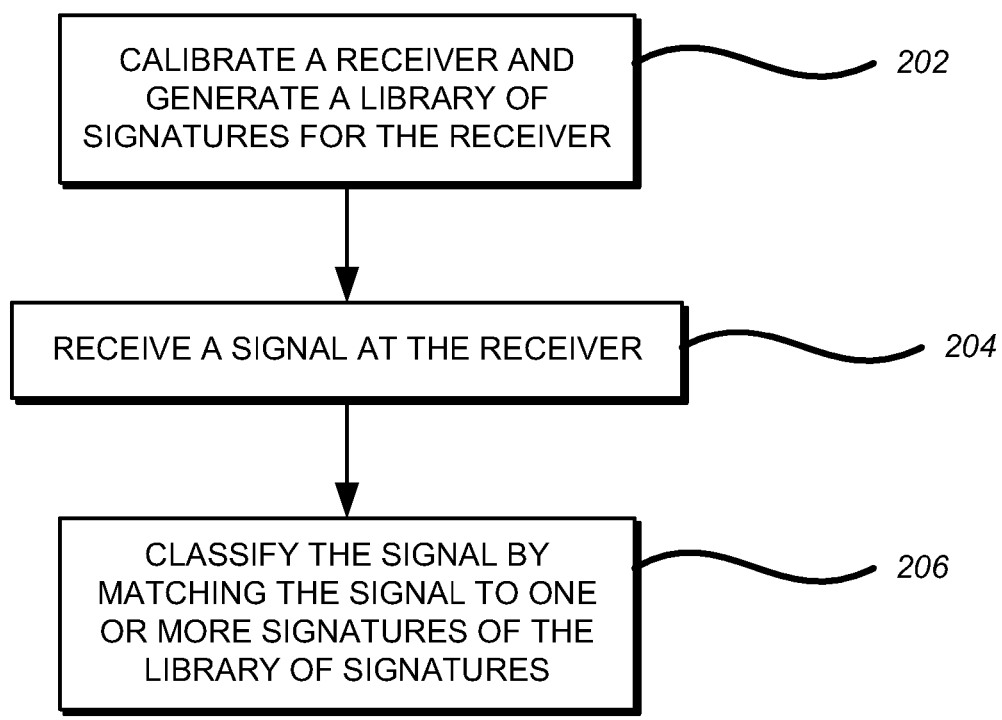
FIG. 2 shows an example method of classifying signals received by a receiver connected to a digital network.

FIG. 2 shows an example method of classifying signals received by a receiver connected to a digital network. The example method includes the operations of calibrating the receiver and generating a library of signatures for the receiver (Operation 202), receiving a signal at the receiver (Operation 204), and classifying the signal by matching the signal to one or more signatures of the library of signatures (Operation 206).

I claim:

1. The method of classifying signals received by a receiver connected to a digital network comprising:
    calibrating the receiver and generating a library of signatures for the receiver,
    receiving a signal at the receiver, and
    classifying the signal by matching the signal to one or more signatures of the library of signatures.

2. The method of claim 1 where the receiver is switched between a first mode in which the receiver is used as part of a wireless access point and a second mode in which the receiver is used to classify signals.

3. The method of claim 2 where the receiver is switched between the first mode and the second mode remaining on the same receive frequency.

4. The method of claim 2 where the receiver is switched between the first mode on a first frequency and the second mode on a second frequency.

5. The method of claim 1 where the receiver is part of a dedicated monitoring device.

6. The method of claim 1 where the receiver is part of a wireless client device.

7. The method of claim 1 where the step of calibrating the receiver and generating a library of signatures comprises:
    exposing the receiver to one or more known signal sources, and
    recording a signature for the one or more known signal sources.

8. The method of claim 7 where one of the known signal sources is a signal generator.

9. The method of claim 7 where one of the known signal sources is a microwave oven.

10. The method of claim 7 where one of the known signal sources is a frequency-hopping device.

11. The method of claim 7 where the signature recorded is a partial signature.

12. The method of claim 1 where the step of calibrating the receiver includes recording the variation of receiver noise floor in the presence of one or more signal sources and recording that variation in the signature.

13. The method of claim 1 where the step of receiving a signal at the receiver further includes using an estimation algorithm to reconstruct incomplete signals.

14. The method of claim 1 where the step of classifying the signal by matching the signal to one or more signatures of the library of signatures comprises:
    matching the signal against a single signature.

15. The method of claim 1 where the step of classifying the signal by matching the signal to one or more signatures of the library of signatures comprises:
    matching the signal against a combination of signatures.

16. The method of claim 1 where the step of classifying the signal by matching the signal to one or more signatures of the library of signatures comprises:
    matching the signal against a combination of signatures of the same type.

17. The method of claim 1 where the step of classifying the signal further includes detecting a signal on multiple channels.

18. The method of claim 17 where the step of detecting a signal on multiple channels uses signature information containing hopping patterns of known frequency hopping devices.

19. The method of claim 17 where the frequency hopping device is a Bluetooth device.

20. The method of claim 17 where the frequency hopping device is a cordless phone.

21. The method of claim 17 where the step of detecting a signal on multiple channels uses signature information on the central frequency and power distribution over the bandwidth of a signal.

22. The method of claim 21 where the signal is generated by a microwave oven.

23. The method of claim 1 where the steps of receiving a signal at the receiver, and
    classifying the signal by matching the signal to one or more signatures of the library of signatures take place in the receiver.

24. The method of claim 1 where the step of matching the signal to one or more signatures of the library of signatures further comprises:
    transferring a representation of the signal to a device connected to the digital network, and
    matching the signal to one or more signatures of the library of signatures on the device connected to the digital network.

25. The method of claim 24 where the device connected to the digital network is a controller supporting a plurality of receivers.

26. The method of claim 1 where the step of receiving a signal further comprises;
    scanning a combination of channels to cover a frequency band.

27. The method of claim 26 further comprising modifying the combination of channels scanned to cover the frequency band and the channels within the band.

28. The method of claim 26 further comprising modifying the combination of channels scanned based on dynamically obtained information to determine scan width and sweep time.

29. The method of claim 26 further comprising selecting channels, channel width, and sweep time based on past detection history.

30. The method of claim 29 where the detection history includes the detection history of 802.11 devices.

31. The method of claim 26 further comprising selecting channels, channel width, and sweep times based on known deployment patterns and configured channels.

* * * * *

UNITED STATES PATENT AND TRADEMARK OFFICE
CERTIFICATE OF CORRECTION

PATENT NO. : 8,660,212 B2 Page 1 of 1
APPLICATION NO. : 13/016458
DATED : February 25, 2014
INVENTOR(S) : Subburajan Ponnuswamy It is certified that error appears in the above-identified patent and that said Letters Patent is hereby corrected as shown below:

In the Claims

Column 7, line 29, in Claim 1, replace "The method of classifying" with --A method of classifying--.

Signed and Sealed this
Thirteenth Day of May, 2014

Michelle K. Lee
*Deputy Director of the United States Patent and Trademark Office*